United States Patent
Fuse et al.

(10) Patent No.: US 9,946,714 B2
(45) Date of Patent: Apr. 17, 2018

(54) INFORMATION PROCESSING APPARATUS AND NON-TRANSITORY COMPUTER READABLE MEDIUM FOR ASSOCIATING MULTIPLE TARGETS

(71) Applicant: FUJI XEROX CO., LTD., Tokyo (JP)

(72) Inventors: Toru Fuse, Yokohama (JP); Zhihua Zhong, Yokohama (JP); Masako Kitazaki, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 158 days.

(21) Appl. No.: 14/339,924

(22) Filed: Jul. 24, 2014

(65) Prior Publication Data

US 2015/0278238 A1    Oct. 1, 2015

(30) Foreign Application Priority Data

Mar. 31, 2014  (JP) ................................ 2014-071247

(51) Int. Cl.
  *G06F 17/00*  (2006.01)
  *G06F 17/30*  (2006.01)
  *G06F 3/0481*  (2013.01)

(52) U.S. Cl.
  CPC .......... *G06F 17/30* (2013.01); *G06F 3/0481* (2013.01)

(58) Field of Classification Search
  CPC ......... G06F 17/30923; G06F 17/30557; G06F 8/24; G06F 3/0416; G06F 17/30
  See application file for complete search history.

(56) References Cited

U.S. PATENT DOCUMENTS

| 6,628,297 | B1 * | 9/2003 | Wraae .................. G06F 17/211 345/628 |
| 2007/0113198 | A1 | 5/2007 | Robertson et al. |
| 2007/0192695 | A1 * | 8/2007 | Grotjohn ............... G06F 9/4443 715/713 |
| 2007/0209020 | A1 * | 9/2007 | Morishita ................ G06F 8/24 715/790 |
| 2008/0189240 | A1 * | 8/2008 | Mullins ............ G06F 17/30557 |
| 2008/0228789 | A1 | 9/2008 | Asakawa et al. |
| 2008/0270444 | A1 * | 10/2008 | Brodie .................. G06F 3/0482 |
| 2010/0235385 | A1 * | 9/2010 | Asai .................. G06F 17/30923 707/769 |
| 2011/0307511 | A1 * | 12/2011 | Asai .................. G06F 17/30926 707/769 |

(Continued)

FOREIGN PATENT DOCUMENTS

| JP | 2001-22749 A | 1/2001 |
| JP | A-2005-202596 | 7/2005 |

(Continued)

OTHER PUBLICATIONS

Jun. 3, 2015 Office Action issued in Australian Patent Application No. 2014208213.

(Continued)

*Primary Examiner* — Tarek Chbouki
(74) *Attorney, Agent, or Firm* — Oliff PLC

(57) ABSTRACT

An information processing apparatus includes: a reception section that receives a deletion operation on a first target; and an associating section that associates a second target with a third target when the second target visually overlaps the third target as a result of the first target being deleted.

5 Claims, 20 Drawing Sheets

(56) References Cited

U.S. PATENT DOCUMENTS

| | | | | |
|---|---|---|---|---|
| 2013/0069860 A1* | 3/2013 | Davidson | ............. | G06F 3/0416 |
| | | | | 345/156 |
| 2014/0280385 A1* | 9/2014 | Prouty | ............. | G06F 17/30339 |
| | | | | 707/812 |
| 2014/0313229 A1* | 10/2014 | Arita | ................. | G01C 21/3667 |
| | | | | 345/634 |

FOREIGN PATENT DOCUMENTS

| | | |
|---|---|---|
| JP | 2011-013743 A | 1/2011 |
| JP | 2011-48453 A | 3/2011 |

OTHER PUBLICATIONS

Jun. 14, 2017 Office Action issued in Japanese Application No. 2014-071247.

Nov. 14, 2017 Office Action issued in Japanese Application No. 2014-071247.

\* cited by examiner

FIG. 6

| 610 | 615 | 620 | 625 | 630 | 635 | 640 | 645 | 650 | 655 | 660 | 665 | |
|---|---|---|---|---|---|---|---|---|---|---|---|---|
| OBJECT ID | OBJECT TYPE | CREATION DATE AND TIME | EDITING DATE AND TIME | CREATOR ID | UPPER LEFT COOR- DINATE | LOWER RIGHT COOR- DINATE | CONTENT | PARENT OBJECT ID | NUMBER OF CHILD OBJECTS | CHILD OBJECT ID (1) | CHILD OBJECT ID (2) | ... |

600

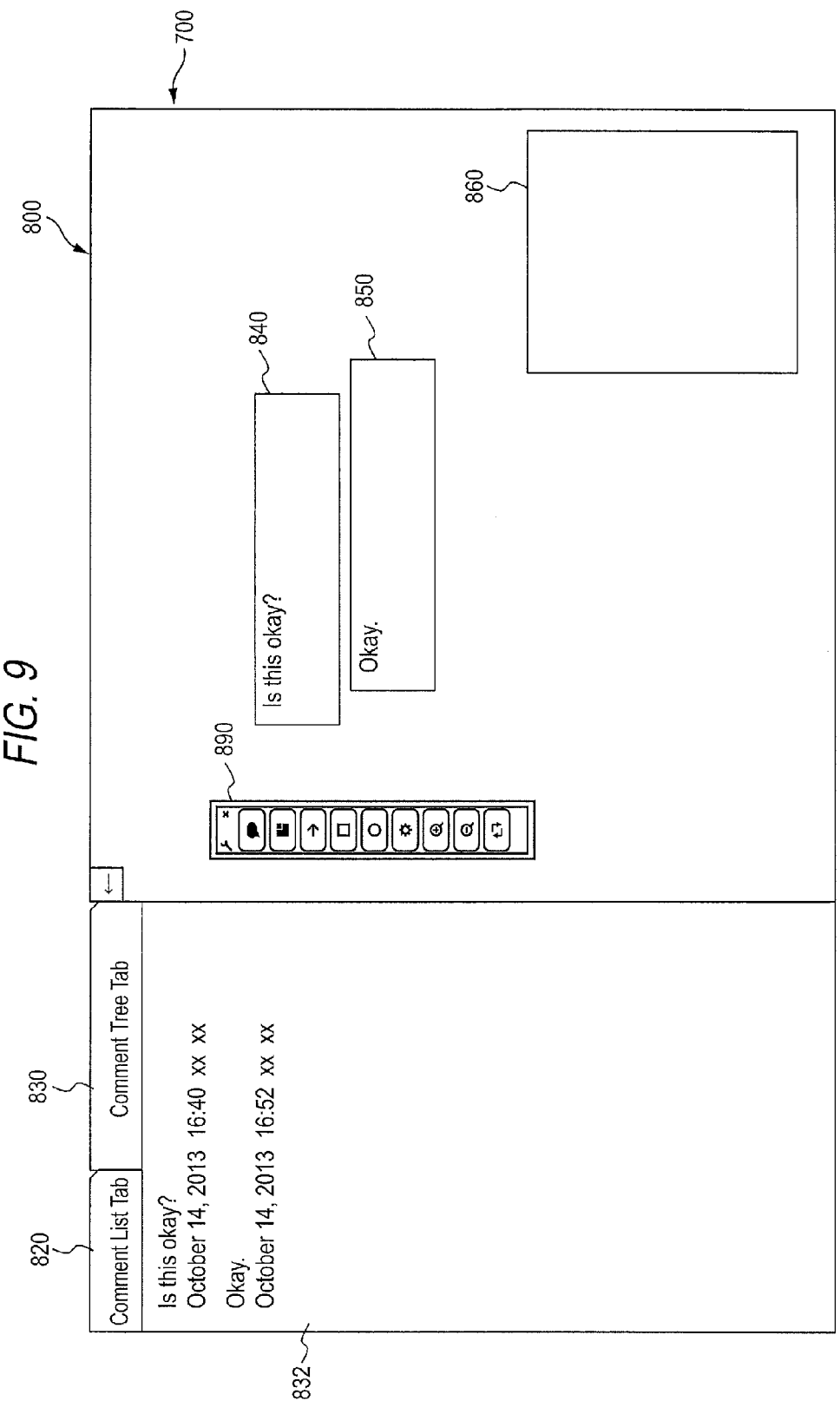

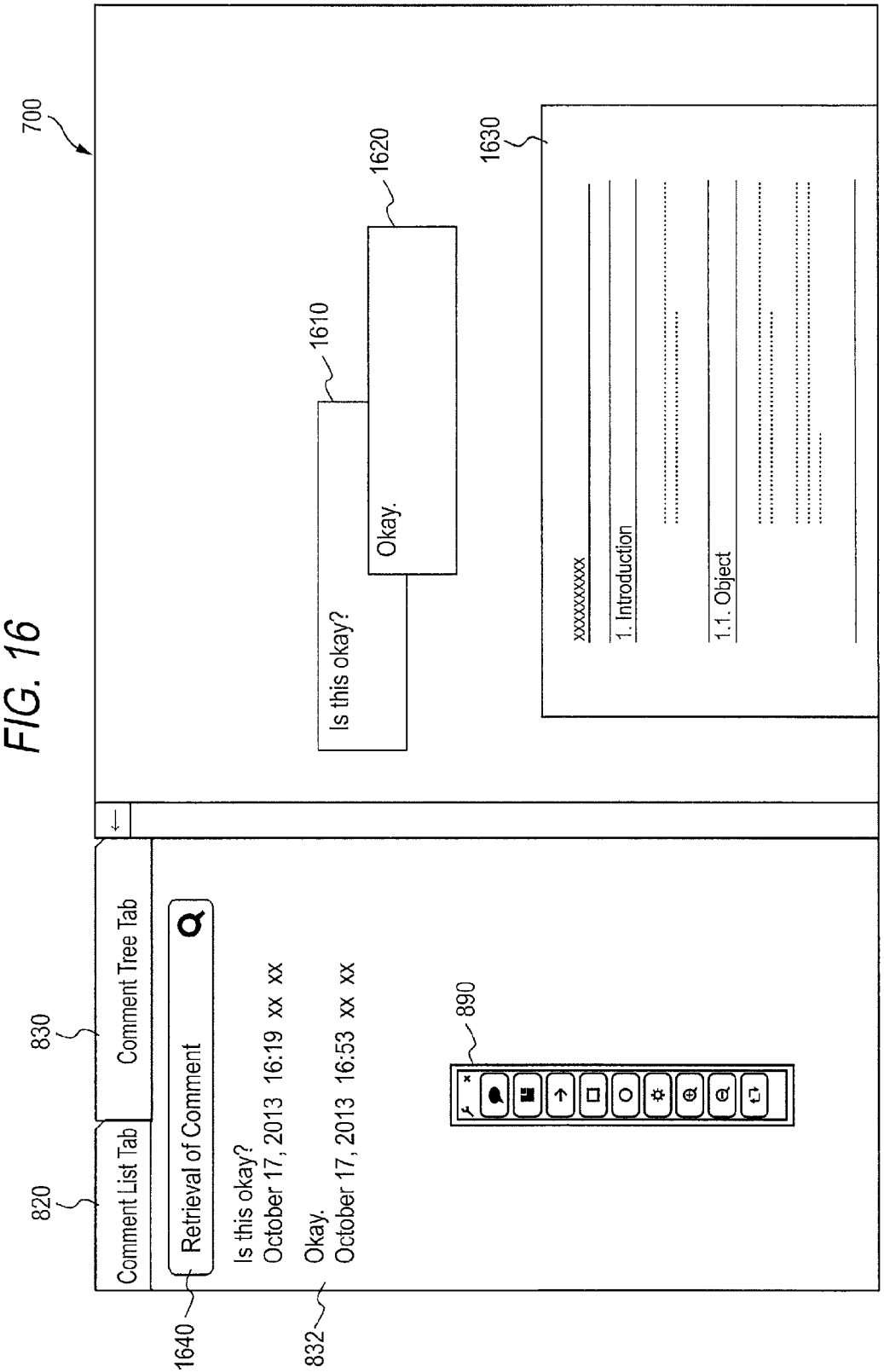

INFORMATION PROCESSING APPARATUS AND NON-TRANSITORY COMPUTER READABLE MEDIUM FOR ASSOCIATING MULTIPLE TARGETS

CROSS-REFERENCE TO RELATED APPLICATIONS

This application is based on and claims priority under 35 USC 119 from Japanese Patent Application No. 2014-071247 filed on Mar. 31, 2014.

BACKGROUND

Technical Field

The present invention relates to an information processing apparatus and a non-transitory computer readable medium.

SUMMARY

According to an aspect of the present invention, it is an information processing apparatus including: a reception section that receives a deletion operation on a first target; and an associating section that associates a second target with a third target when the second target visually overlaps the third target as a result of the first target being deleted.

BRIEF DESCRIPTION OF THE DRAWINGS

Exemplary embodiment(s) of the present invention will be described in detail based on the following figures, wherein

FIG. 6 is a diagram illustrating a data structure example of an object management table;

FIG. 9 is a diagram illustrating a process example according to the present embodiment;

FIG. 16 is a diagram illustrating a process example according to the present embodiment;

DETAILED DESCRIPTION

Hereinafter, a preferred embodiment for realizing the present invention will be described with reference to the drawings.

Figure 1:
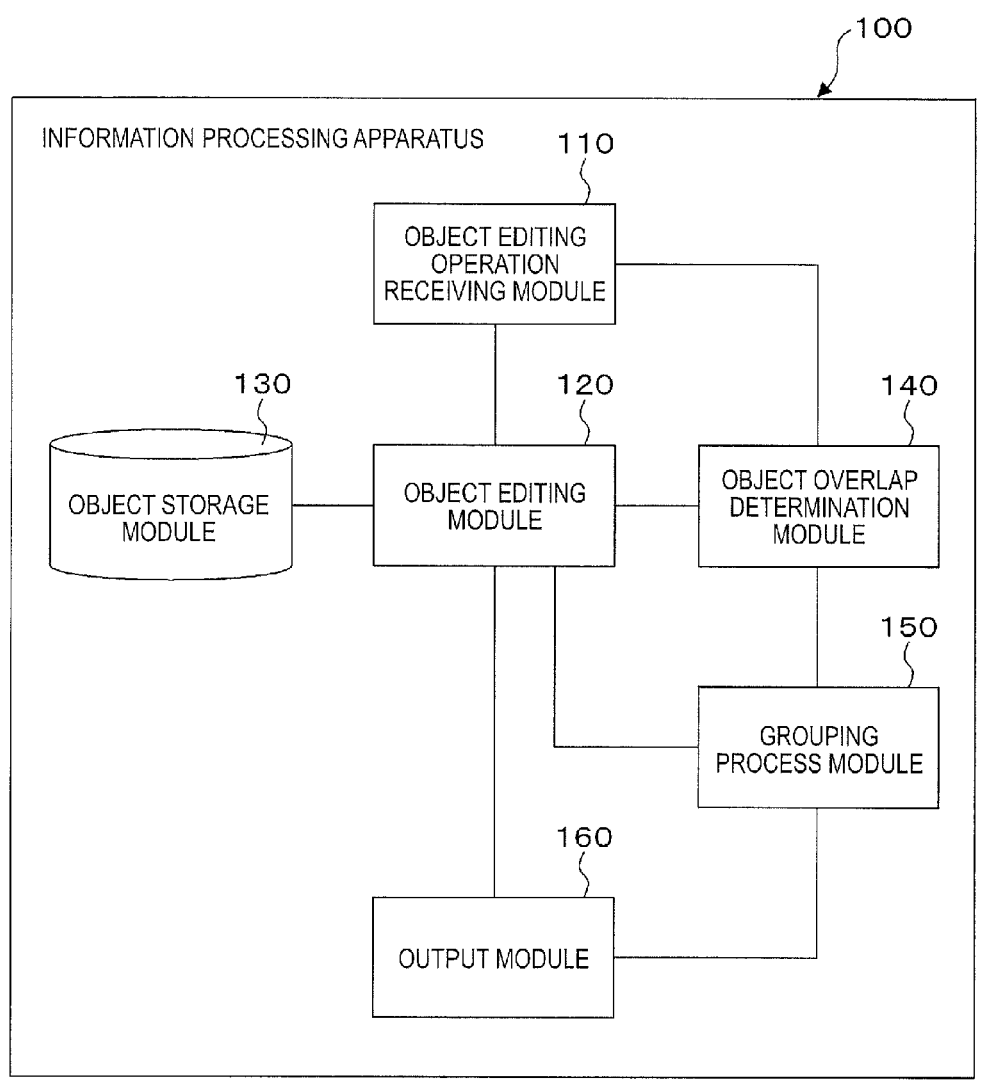
FIG. 1 is a conceptual module configuration diagram for a configuration example of the present embodiment.

FIG. 1 is a conceptual module configuration diagram for a configuration example of the present embodiment.

In addition, the module generally indicates a component such as software (computer program) or hardware which can be logically divided. Therefore, the module in the present embodiment indicates not only a module in a computer program but also a module in a hardware configuration. Accordingly, the present embodiment also describes a computer program (a program causing a computer to perform each procedure, a program causing a computer to function as each piece of means, or a program causing a computer to realize each function), a system, and a method which function as such a module. However, for convenience of description, terms "storing", "being stored", or the same terms as those are used, but these terms indicates that data is stored in a storage device or is controlled so as to be stored in the storage device in a case where an embodiment indicates a computer program. In addition, a module may correspond to a function in a one-to-one relationship, but, in an implementation, a single module may be formed by a single program, plural modules may be formed by a single program, or, conversely, a single module may be formed by plural programs. Further, plural modules may be executed by a single computer, and a single module may be executed by plural computers in a distributed or parallel environment. Furthermore, a certain module may include another module. Moreover, hereinafter, "connection" is used not only in a case of physical connection but also in a case of logical connection (transmission and reception or indication of data, a reference relationship between data items, or the like). The term "being predetermined" indicates being defined before a target process is performed, and is used to include being defined according to circumstances or states at that time or circumstances or states hitherto before a target process is performed not only before a process of the present embodiment is started but also even after the process of the present embodiment is started. In a case where there are plural "predetermined values", the values may be different values, and two or more values (of course, including all the values) may be the same. In addition, description that "if A occurs, B is performed" indicates that "it is determined whether or not A occurs, and if it is determined that A occurs, B is performed". However, a case where determination of it is determined whether or not A occurs is not necessary is excluded.

In addition, a system or an apparatus includes not only a case where plural computers, hardware, apparatuses, or the like are connected to each other via communication means such as a network (including one-to-one correspondence) so as to configure the system or the apparatus, but also a case where the system or the apparatus is implemented by a single computer, hardware, apparatus, or the like. The "system" and the "apparatus" are used as the same terminology as each other. Of course, the "system" does not include a social "mechanism" (social system) which is an artificial arrangement.

In addition, for each process performed by each module, or for each process in a case where plural processes are performed in a module, target information is read from a storage device, and a process result is written to the storage device after the process is performed. Therefore, description of reading from the storage device before the process and writing to the storage device after the process will be omitted in some cases. Further, the storage device here may include a hard disk, a random access memory (RAM), an external recording medium, a storage device using a communication line, a register in a CPU, and the like.

An information processing apparatus 100 according to the present embodiment edits a target on the basis of an operation performed by an operator, and includes, as illustrated in an example of FIG. 1, an object editing operation receiving module 110, an object editing module 120, an object storage module 130, an object overlap determination module 140, a grouping process module 150, and an output module 160. Here, editing targets (hereinafter, also referred to as an object) indicate an electronic label, an electronic document, a graphic, an electronic mount (hereinafter, also referred to as a stage), and the like which are displayed on a display device such as a liquid crystal display. The electronic mount is an object to which an electronic label, an electronic document, a graphic, and the like are attached. The electronic label imitates a label, and can be attached to an electronic mount, an electronic document, and an electronic label. The graphic is an object such as an arrow, a square, or a circle, and can be drawn on an electronic label, an electronic document, or the electronic mount. Hereinafter, an association between electronic labels will be described as an example of an association between objects, but may be an association between other objects. In addition, a limitation may be put on the association between objects. As the limitation, for example, in a case where an association between objects forms a tree structure, there is a limitation in which an electronic mount can become a root in the tree structure, but a child cannot become the root, a limitation in which an electronic document can become a parent of an electronic label, but cannot become a child of the electronic label, and the like. In addition, hereinafter, the terms such as a "parent", a "child", and a "descendent" are used as terms indicating relationships with other elements in a tree structure.

The object editing operation receiving module 110 is connected to the object editing module 120 and the object overlap determination module 140. The object editing operation receiving module 110 receives an editing operation on a first object. The editing operation includes, for example, a deletion operation for deleting an object, a movement operation for moving an object on an electronic mount, and the like. In addition, the movement indicates that an object is deleted from a movement source, and the object is moved to a movement destination. Other editing operations include new creation, enlargement, reduction, copying, and the like of an object. For example, an object is selected in response to an operator's operation on a keyboard, a mouse, a touch pad, and an editing operation is performed by selecting a menu, through a gesture, or the like.

The object editing module 120 is connected to the object editing operation receiving module 110, the object storage module 130, the object overlap determination module 140, the grouping process module 150, and the output module 160. The object editing module 120 edits an object on the basis of an editing operation which is received by the object editing operation receiving module 110.

The object storage module 130 is connected to the object editing module 120. The object storage module 130 is accessed by the object editing module 120, and stores an object which is an editing target. For example, an object management table 600 is stored. FIG. 6 is a diagram illustrating a data structure example of the object management table 600. The object management table 600 includes an object ID column 610, an object type column 615, a creation date and time column 620, an editing date and time column 625, a creator ID column 630, an upper left coordinate column 635, a lower right coordinate column 640, a content column 645, a parent object ID column 650, a number of child objects column 655, a child object ID (1) column 660, and a child object ID (2) column 665. The object ID column 610 stores information (object identification (ID)) for uniquely identifying an object in the present embodiment. The object type column 615 stores the type of object (information indicating the type of object such as an electronic label, an electronic document, a graphic, and an electronic mount). The creation date and time column 620 stores the date and time when an object is created (the date and time may be a year, a month, a day, an hour, a minute, a second, or a combination thereof; this is also the same for the following). The editing date and time column 625 stores the date and time in which the edition was performed for the object. The editing date and time column 625 may be provided in a plural manner. The creator ID column 630 stores information (creator ID) for uniquely identifying a creator in the present embodiment. The upper left coordinate column 635 stores an upper left coordinate of an object. The lower right coordinate column 640 stores a lower right coordinate of an object. The coordinate is information indicating a position of an object on an electronic mount. For example, an XY coordinate is set on the electronic mount, and if an object is a rectangle, a position of the object is represented by coordinates of an upper left corner and a lower right corner. The content column 645 stores content of an object. For example, the content may be text information, an image, a graphic, or the like, and may be a place (for example, uniform resource identifier (URI)) at which the content is stored. The parent object ID column 650 stores information (parent object ID) for uniquely identifying a parent object in a tree structure in the present embodiment. The number of child objects column 655 stores the number of child objects. The child object ID (X) column (X≥1) is present by the number stored in the number of child objects column 655. The child object ID (1) column 660 and the child object ID (2) column 665 store information (child object ID) for uniquely identifying a child object for a corresponding object in a tree structure in the present embodiment.

For example, if a deletion operation of an object is performed, a row of the object may be deleted. In addition, if an object is moved, the upper left coordinate column 635 and the lower right coordinate column 640 of the object may be changed to a coordinate of a movement destination. Further, if plural objects are edited, information in the object management table 600 regarding plural objects may be changed.

The object overlap determination module 140 is connected to the object editing operation receiving module 110, the object editing module 120, and the grouping process module 150. The object overlap determination module 140 determines whether or not there is an overlap (visual overlap) between objects in a case where an object is edited. In a case where an object is deleted, an overlap relationship after deletion is determined with peripheral objects of the deleted object as targets. In a case where an object is moved, an overlap relationship after movement in the periphery of the moved object at a movement destination and an overlap relationship after the movement in the periphery of the moved object at a movement source, are determined. For example, in a case where a first object is deleted, it is determined whether or not a second object and a third object overlap each other as a result of deleting the first object. Generally, in a case where the first object overlaps the second object, and the first object overlaps the third object before the deletion, an overlap between the second object and the third object may be determined. In addition, in a case where the first object is moved, it may be determined whether or not the first object overlaps a fourth object at a movement destination. Further, it is determined whether or not the second object overlaps the third object at a movement source as a result of the first object being moved. This determination is performed by using the upper left coordinate column 635 and the lower right coordinate column 640 of the object management table 600.

In addition, the object overlap determination module 140 may perform not only the determination of an overlap between objects but also calculation of an overlap area (an area of an overlap region). The calculation of the area is also performed by using the upper left coordinate column 635 and the lower right coordinate column 640 of the object management table 600.

Further, the object overlap determination module 140 may set a predetermined width in the vicinity of an object and may determine an overlap including the peripheral region in the determination of whether or not there is an overlap. In other words, in the determination of an overlap, a region of an object may be enlarged and then may be determined.

The grouping process module 150 is connected to the object editing module 120, the object overlap determination module 140, and the output module 160. In a case where it is determined by the object overlap determination module 140 that there is an overlap between objects, the grouping process module 150 associates the objects with each other. When the above-described example is used, in a case where the second object and the third object overlap each other as a result of deleting the first object, the second object is associated with the third object. In a case where the first object overlaps the fourth object at a movement destination of the first object as a result of moving the first object, the first object is associated with the fourth object. In addition, in a case where the second object overlaps the third object at a movement source as a result of moving the first object, the second object is associated with the third object.

In addition, the grouping process module 150 may perform an association in which an overlapped object (an object located on a lower side in a display form) in the overlap is set to an upper layer in a tree structure, and an overlapping object (an object located on an upper side in a display form) is set to a lower layer in the tree structure. As a result of the association, the overlapped object becomes a parent in the tree structure, and the overlapping object becomes a child in the tree structure. When the above-described example is used, in a case where the first object overlaps the fourth object at a movement destination of the first object as a result of moving the first object, the fourth object becomes an overlapped object, and the first object becomes an overlapping object.

In addition, in a case where there are plural overlapped objects, and there is an association between the overlapped objects, the grouping process module 150 may associate an overlapping object with a lower layer of an overlapped object which is located at the lowest layer in plural overlapped objects. The term "there being an association" indicates that plural objects are included in the same tree structure. Therefore, there is not only a case where the objects have a direct parent-child relationship (a relationship in which there are no other objects between the objects), but also a case where the objects have fraternity, a parent-child relationship with one or more elements (a parent or a child) interposed therebetween, and the like. In addition, in a case where there are plural overlapped objects located at the lowest layer, and the overlapped objects have fraternity, an overlapping object is associated with a lower layer of an overlapped object which has a large overlap area with the overlapping object.

Further, in a case where there are plural overlapped objects, and there is no association between the overlapped objects, the grouping process module 150 may associate an overlapping object with a lower layer of an overlapped object which has a large overlap area with the overlapping object.

Furthermore, an object which is a target of a deletion operation or a movement operation may be an object group which has an association in which the object is located at an upper layer. The object group includes an object an object which is a target of a deletion operation or a movement operation. Therefore, the object group is formed by two or more objects.

The output module 160 is connected to the object editing module 120 and the grouping process module 150. The output module 160 outputs a result of editing performed by the object editing module 120 and a result of an association performed by the grouping process module 150. The term "outputting" includes, for example, displaying an object in which an editing result or an association result is reflected on a display device such as a liquid crystal display, storing the object in a recording medium such as a memory card, and sending the object to other information processing apparatuses.

Figure 2:
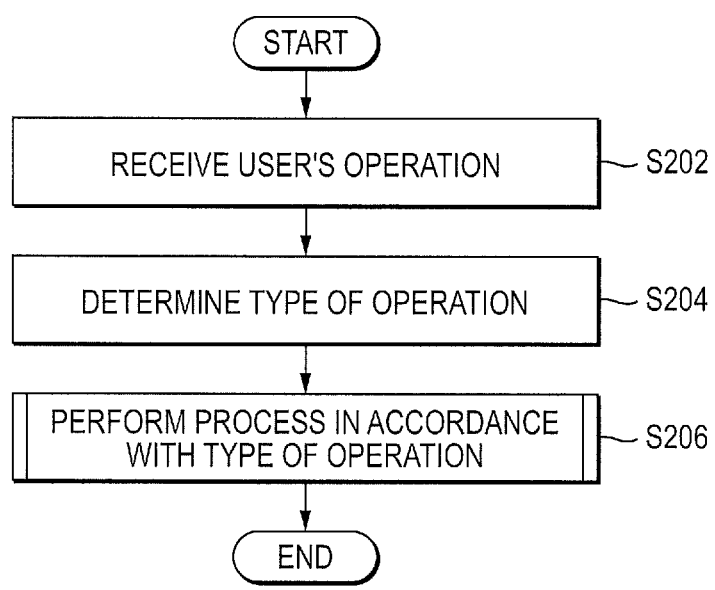
FIG. 2 is a flowchart illustrating a process example according to the present embodiment.

FIG. 2 is a flowchart illustrating a process example according to the present embodiment.

In step S202, the object editing operation receiving module 110 receives a user's operation. An editing operation on an object which is currently displayed on a display device such as a liquid crystal display, in response to an operator's operation on a keyboard, a mouse, or a touch pad.

Figure 7A:
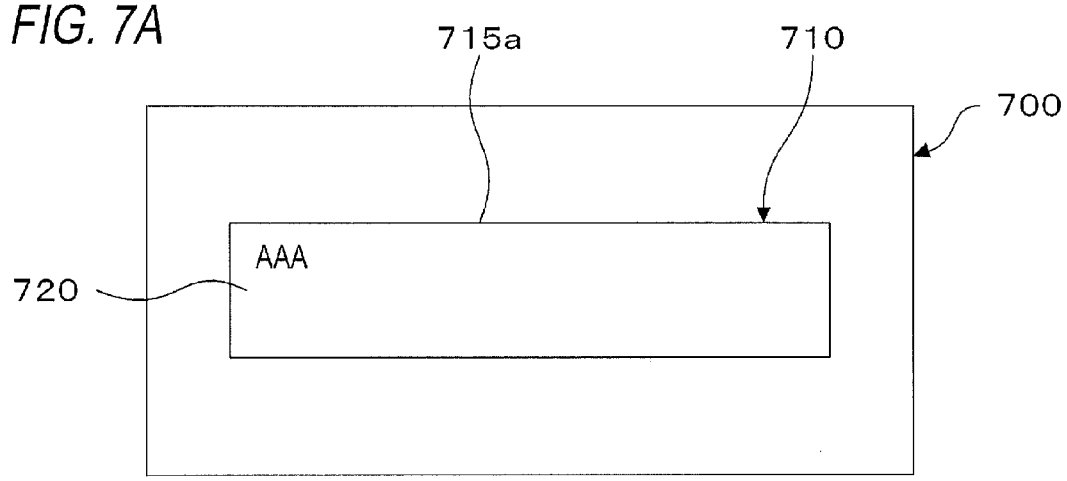
FIGS. 7A and 7B are diagrams illustrating an example of an electronic label.
Figure 7B:
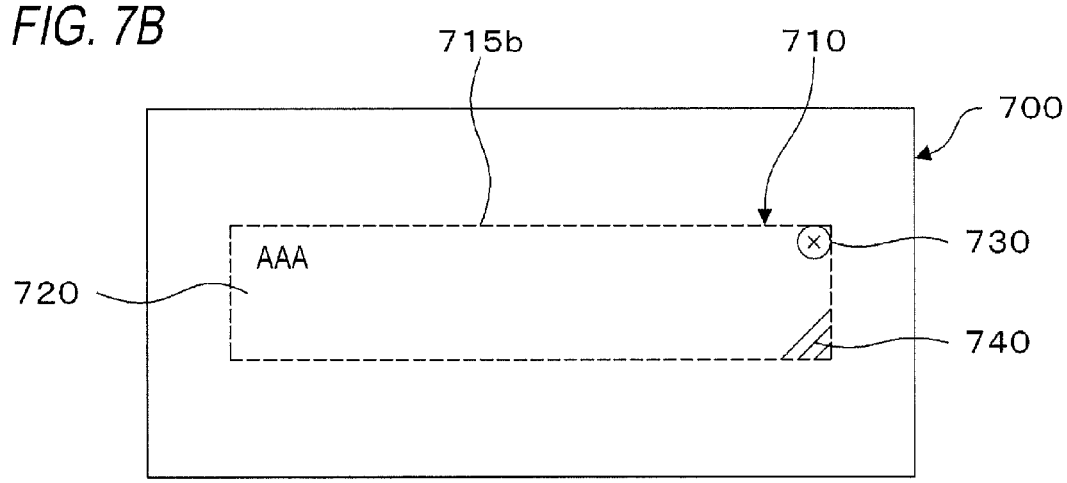

An example of an electronic label as an object will be described with reference to FIGS. 7A and 7B. As illustrated in an example of FIG. 7A, an electronic label 710 is displayed on a stage 700. In the stage 700, an electronic label content display region 720 is surrounded by an electronic label range 715*a*, and content is displayed in the electronic label content display region 720. When the electronic label 710 is clicked, the electronic label 710 is turned to a selection state. The electronic label 710 in the selection state is displayed at the highest rank, and a display change of a descendent is not performed. In addition, as illustrated in an example of FIG. 7B, as a selection state, for example, the electronic label range 715*a* which is not selected may be changed to an electronic label range 715*b* (dotted line). Further, a color the electronic label range 715*b* may be changed to a color different from a color of the electronic label range 715*a*. In addition, in a case where the operator is a registrant (creator) of the object, a deletion instruction icon 730 may be displayed at an upper right part, and a selection state display icon 740 may be displayed at a lower right part. When the electronic label 710 in the selection state is clicked, the selection state is maintained. Further, when the stage 700 (a region other than the electronic label 710 in FIGS. 7A and 7B) is clicked, the selection state of the electronic label 710 is canceled. Return to the original display state illustrated in the example of FIG. 7A occurs, the electronic label range 715*b* is changed to the electronic label range 715*a*, and the selection state display icon 740 and the deletion instruction icon 730 are not displayed. In addition, when another object which is not the electronic label 710 is clicked, the selection state is canceled, and another object is turned to a selection state. If said another object is moved, the selection state of the object is canceled. The electronic label 710 in the selection sate is a target of editing such as movement or deletion.

In step S204, the object editing module 120 determines the type of operation. The type of editing is determined on the basis of a keyboard operation, selection of a menu, a gesture, or the like. For example, if a "Delete" key is pressed, a deletion operation is determined, and if an object is moved in a selection state, a movement operation is determined. For example, if an electronic label is selected with a mouse (touch start in a touch panel), and is then moved with the mouse (touch move in the touch panel) for a while (period longer than a predetermined value), it is determined that the electronic label is moved, and it is determined that the electronic label is stopped through an operation of releasing the mouse (touch end in the touch panel). In addition, if an electronic document to which an electronic label is attached is moved, the electronic label is also moved.

Further, only a selected electronic label may be moved, and an electronic label as a descendent when a selected electronic label is set as a parent may also be moved. In relation to a differentiation therebetween, which movement occurs may be determined, for example, by comparing the time from selection to movement with a predetermined threshold time.

Figure 3:
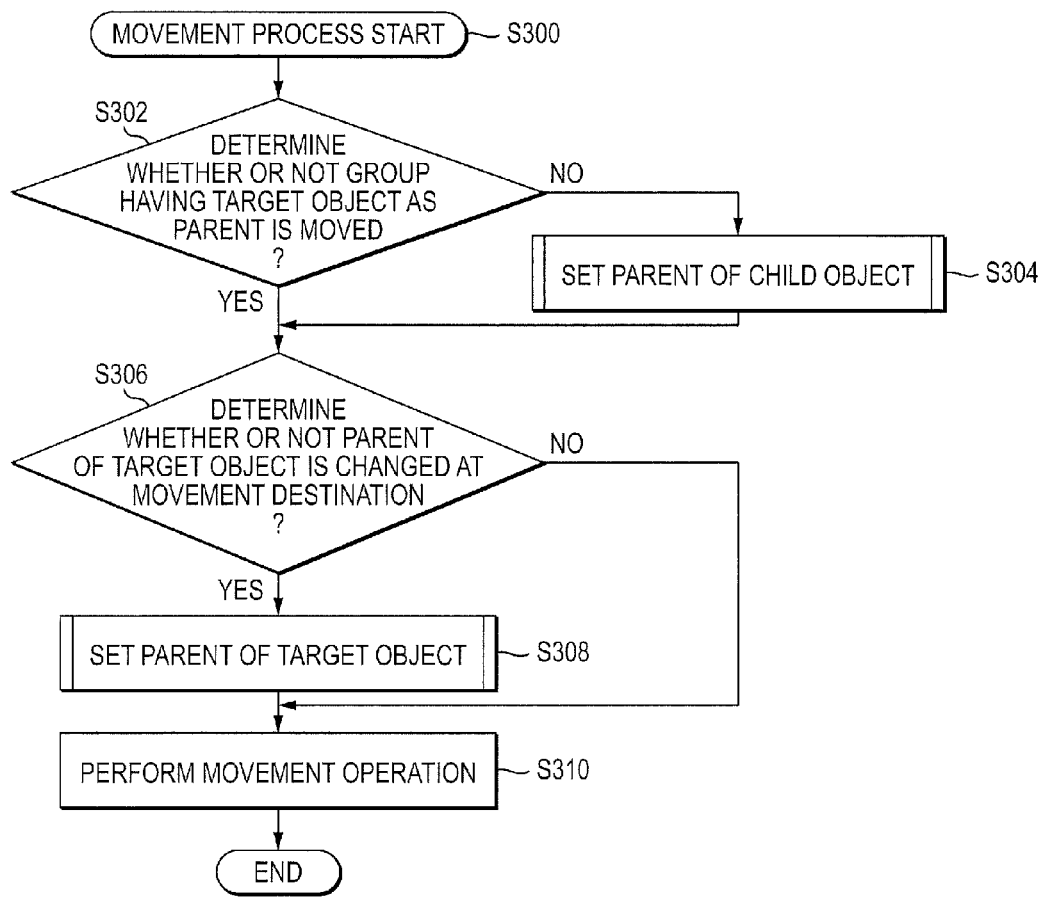
FIG. 3 is a flowchart illustrating a movement process example according to the present embodiment.
Figure 4:
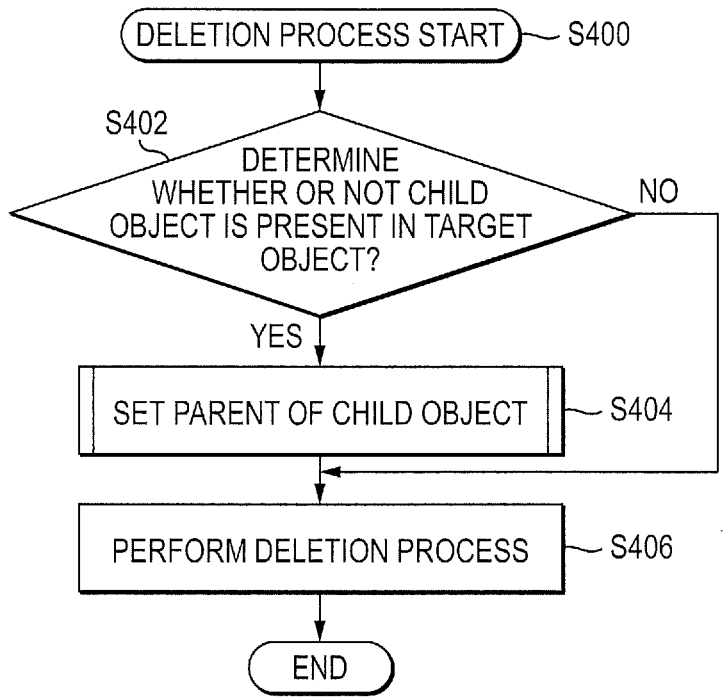
FIG. 4 is a flowchart illustrating a deletion process example according to the present embodiment.

In step S206, the object editing module 120, the grouping process module 150, and the like perform a process in accordance with the type of operation. In a case of a movement operation, a process according to a flowchart exemplified in FIG. 3 is performed, and in a case of a deletion operation, a process according to a flowchart exemplified in FIG. 4 is performed.

Figure 8:
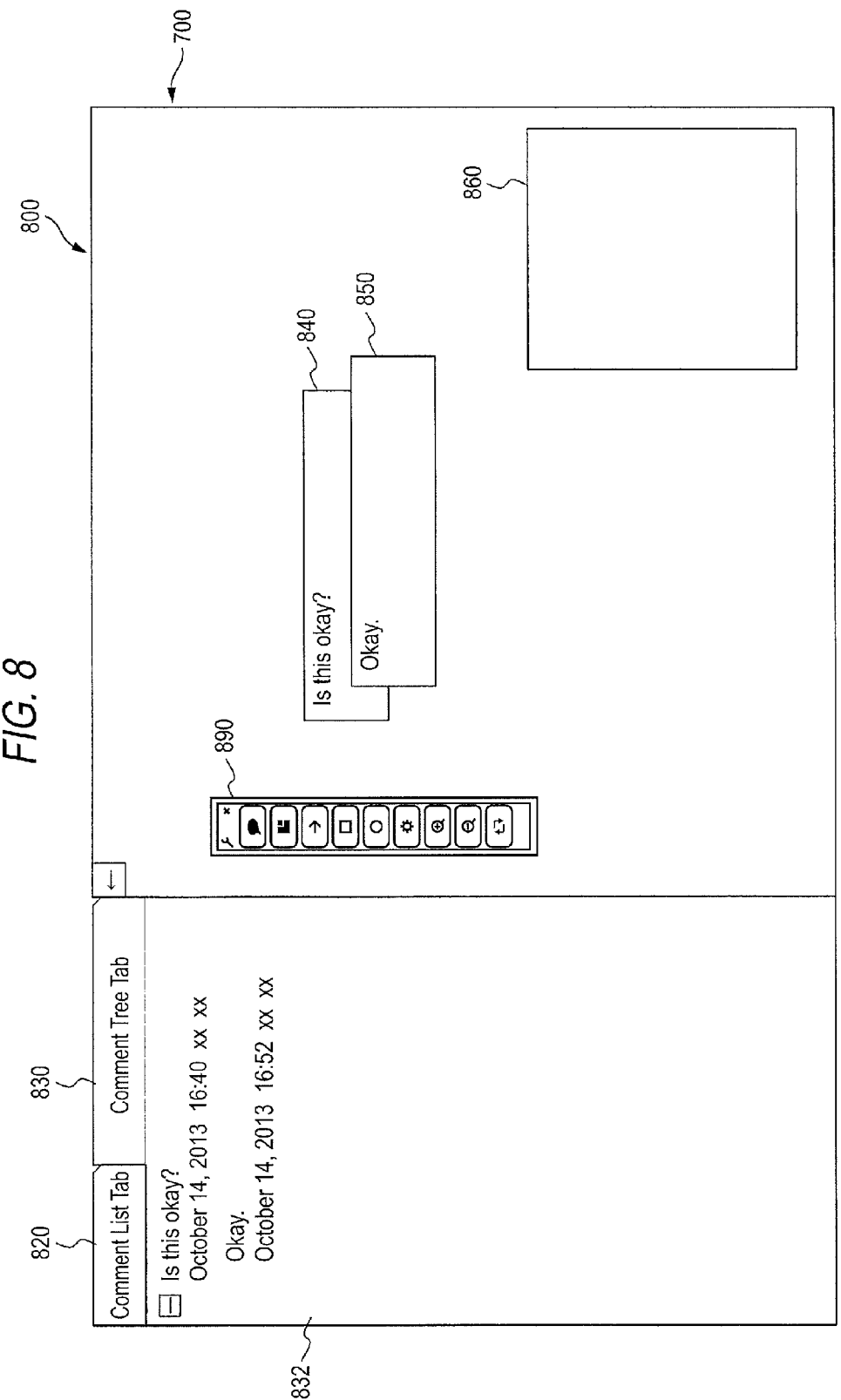
FIG. 8 is a diagram illustrating a process example according to the present embodiment.

As illustrated in an example of FIG. 8, a comment display region formed by a comment list tab 820 and a comment tree tab 830, and the stage 700 are displayed on a screen 800. An electronic label 840, an electronic label 850, and an electronic document 860 are disposed in the stage 700, and a menu 890 is displayed. The electronic label 840 and the electronic label 850 overlap each other, and the electronic label 840 and the electronic label 850 are associated with each other. In this case, the electronic label 840 becomes a parent, and the electronic label 850 becomes a child. In addition, the electronic document 860 does not overlap the electronic label 840 and the electronic label 850, but overlaps the stage 700. Of course, the electronic label 840 also overlaps the stage 700. Therefore, the stage 700 is a parent, and the electronic label 840 and the electronic document 860 are children. Further, the electronic label 850 overlaps the stage 700 and the electronic label 840. This corresponds to a case where there are plural overlapped object, and there is an association between the overlapped objects (between the stage 700 and the electronic label 840). Therefore, in a tree structure formed by the stage 700 and the electronic label 840, the electronic label 850 is associated with a lower layer of the electronic label 840 located at the lowest layer. Furthermore, the menu 890 is a menu for drawing a graphic.

In addition, the comment display region formed by the comment list tab 820 and the comment tree tab 830 represents a state in the stage 700, and, in a case where the comment list tab 820 is selected, content of the electronic label 840 and the electronic label 850 is displayed in a list in the comment display region. For example, the content may be arranged in an order of the creation date and time, in an order of creators, or the like. When the comment tree tab 830 is selected, a tree structure of the electronic label 840 and the electronic label 850 is reflected in a comment tree display region 832, and contents thereof are displayed. For example, as illustrated in FIG. 8, a parent-child relationship is represented by a distance from the left end. The content "Is this okay?" of the electronic label 840 is displayed at the left end, and the content "Okay." of the electronic label 850 which is a child thereof is displayed thereunder at a position separated from the left end by a predetermined distance (by a unit distance indicating a lower-rank layer in the tree structure).

A case where only the electronic label 840 is selected and moved in this state is illustrated in an example of FIG. 9. As a result of the movement, the electronic label 840 does not overlap the electronic label 850, and thus a parent-child relationship between the electronic label 840 and the electronic label 850 is removed. In other words, a different tree structure is formed. In this case, a tree structure of only the electronic label 840 and a tree structure of only the electronic label 850 are formed. In addition, the separate tree structures do not include a tree structure which has the stage 700 as a root. In other words, the tree structures are separate tree structures in a range which does not go back to the tree structure which has the stage 700 as a root. Further, in relation to display in the comment tree display region 832 after the movement is performed, both of the content items of the electronic label 840 and the electronic label 850 are displayed at the left end. In other words, this indicates that the electronic label 840 and the electronic label 850 have no parent-child relationship in the tree structure.

Of course, in a case where the electronic document 850 as a child having the electronic label 840 as a parent illustrated in the example of FIG. 8 is also moved, the movement is performed in a state in which the overlap relationship is maintained, and thus a relationship between the electronic label 840 and the electronic label 850 is maintained without change. Therefore, the display content in the comment tree display region 832 is also maintained without change in an example of FIG. 8.

In addition, in a case where a reduction operation of an electronic label is performed, the following limitation may be put. In a case where a child object is present in an electronic label which is a reduction operation target, a size may be reduced, but a reduction is allowed in a range in which an overlap with all child objects can be maintained. Further, in a case where a parent object is present in an electronic label which is a reduction operation target, a size may be reduced, but a reduction is allowed in which an overlap with all parent objects can be maintained. Therefore, in an object which has a parent or a child relationship with an object which is a reduction operation target, an overlap relationship indicating the parent-child relationship is maintained.

FIG. 3 is a flowchart illustrating a movement process example according to the present embodiment.

In step S300, a movement process starts.

In step S302, the object editing module 120 determines whether or not a group having a target object as a parent is moved, and if a group having a target object as a parent is moved, the process proceeds to step S306, and, if otherwise, the process proceeds to step S304. Here, the target object is a selected object. Here, the group includes a descendent object (including up to an object serving as a root) which has the target object as a parent in a tree structure.

In step S304, the grouping process module 150 sets a parent of a child object of the target object. Since only the target object is moved, an association for the child object is performed on the basis of an overlap relationship which occurs due to the target object being deleted from the movement source. Details of the process will be described later with reference to a flowchart exemplified in FIG. 5.

In step S306, the object editing module 120 determines whether or not a parent of the target object is changed at a movement destination. If changed, the process proceeds to step S308, and if otherwise, the process proceeds to step S310.

In step S308, the grouping process module 150 sets a parent of the target object. An association is performed on the basis of a new overlap relationship occurring at the movement destination. Details of the process will be described later with reference to a flowchart exemplified in FIG. 5.

In step S310, the object editing module 120 performs the movement process. Coordinates (the upper left coordinate column 635 and the lower right coordinate column 640 of the object management table 600) of the target object are changed to coordinates at the movement destination, and a result of the association is reflected (the parent object ID column 650, the number of child objects column 655, the child object ID (1) column 660, the child object ID (2) column 665, and the like of the object management table 600), and a movement result is displayed.

FIG. 4 is a flowchart illustrating a deletion process example according to the present embodiment.

In step S400, a deletion process starts.

In step S402, the object editing module 120 determines whether or not a child object is present in a target object, and if a child object is present, the process proceeds to step S404, and if otherwise, the process proceeds to step S406.

In step S404, the grouping process module 150 sets a parent of the child object. An association is performed on the basis of a new overlap relationship which occurs due to the deletion. Details of the process will be described later with reference to a flowchart exemplified in FIG. 5.

In step S406, the object editing module 120 performs the deletion process.

Figure 5:
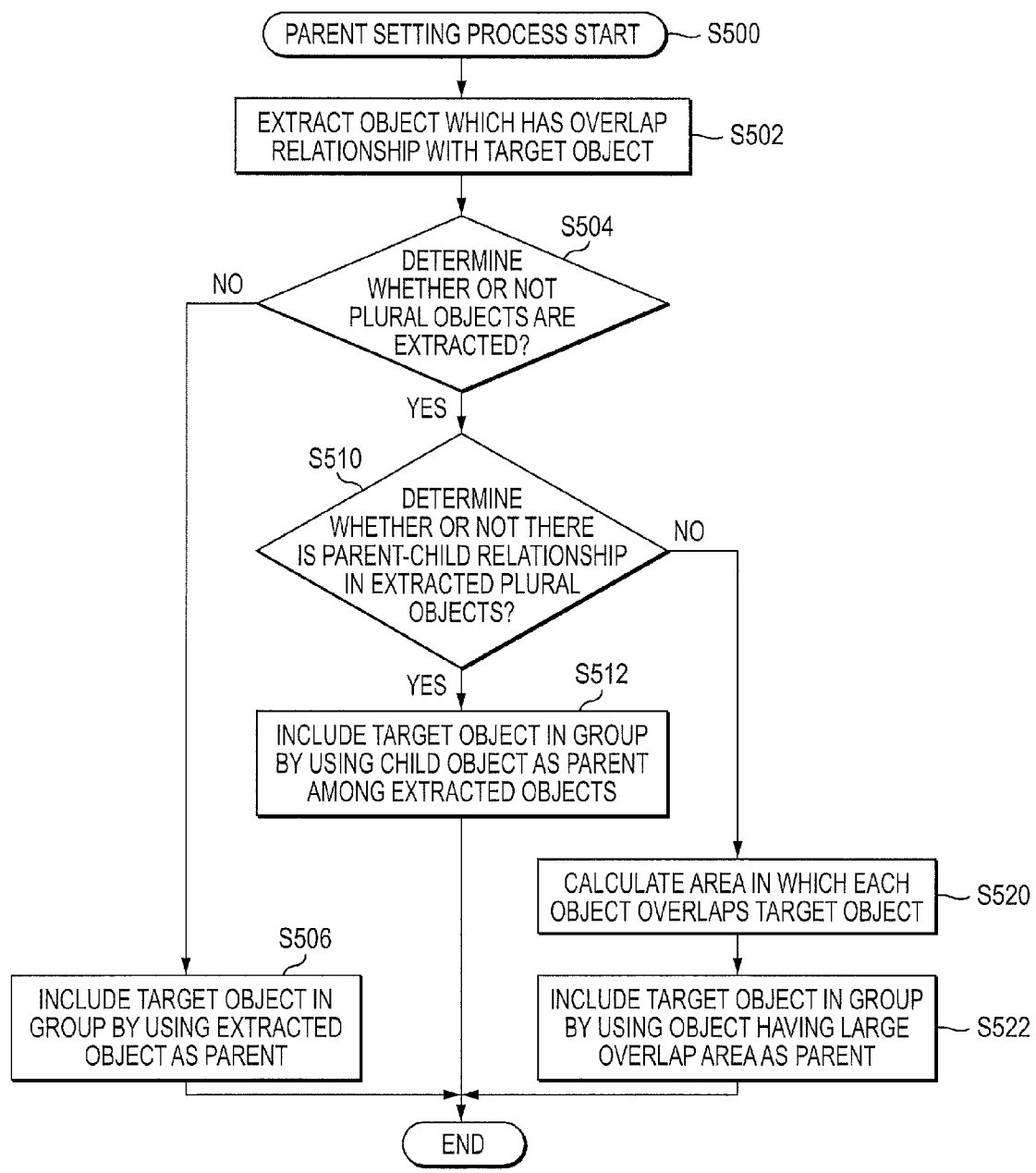
FIG. 5 is a flowchart illustrating a parent setting process example according to the present embodiment.

FIG. 5 is a flowchart illustrating a parent setting process example according to the present embodiment.

In step S500, a parent setting process starts.

In step S502, the object overlap determination module 140 extracts an object which has an overlap relationship with a target object. The target object here is an object which is a movement target, or an object having a child relationship with an object which is a movement target at a movement source, in a case of a movement process. In addition, in a case of a deletion process, the target object is an object having a child relationship with an object which is a deletion target. In addition, an object at a movement source and a movement destination, or in the periphery (within a predetermined distance from an object which is a process target) of a deletion position, may be used as a target object.

In step S504, the object overlap determination module 140 determines whether or not plural objects are extracted in step S502, and if plural objects are extracted, the process proceeds to step S510, and if otherwise (if a single object is extracted), the process proceeds to step S506.

In step S506, the grouping process module 150 includes the target object in a group by using the object extracted in step S502 as a parent. Details thereof will be described later with respect to an example of FIGS. 10A and 10B.

In step S510, the grouping process module 150 determines whether or not there is a parent-child relationship in plural objects extracted in step S502, and if there is the parent-child relationship, the process proceeds to step S512, and if otherwise, the process proceeds to step S520.

In step S512, the grouping process module 150 includes the target object in a group by using a child object as a parent among the objects extracted in step S502. Details thereof will be described later with reference to an example of FIGS. 11A and 11B.

In step S520, the object overlap determination module 140 calculates an area in which each object overlaps the target object.

In step S522, the grouping process module 150 includes the target object in a group by using an object having a large overlap area as a parent. Details thereof will be described later with reference to an example of FIGS. 12A and 12B.

Description will be made of an association rule based on an overlap relationship between an electronic label and an object by using examples illustrated in FIGS. 10A to 12B. As an object which can become a parent of an electronic label, there are a stage, a page of an electronic document, and an electronic label.

Figure 10A:
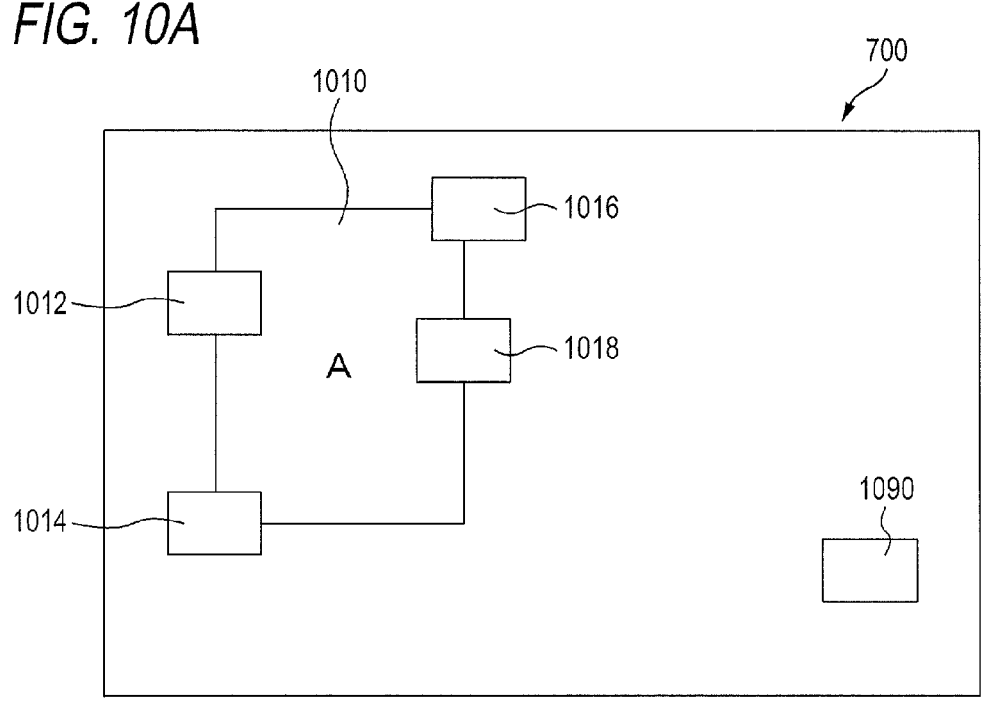
FIGS. 10A and 10B are diagrams illustrating a process example according to the present embodiment.
Figure 10B:
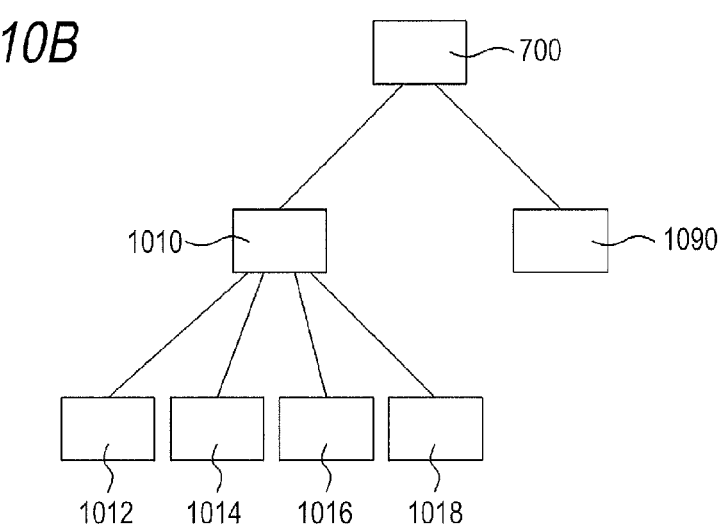

FIGS. 10A and 10B are diagrams illustrating a process example according to the present embodiment. As long as an electronic label is placed on an object, a parent is the corresponding object. In addition, a parent is the stage 700 only in a case where a region of the electronic label is entirely located in the stage (in a case where there is no overlap with objects other than the stage). As illustrated in an example of FIG. 10A, electronic labels 1012, 1014, 1016 and 1018 overlap an electronic document 1010, and an electronic label 1090 does not overlap objects other than the stage 700. A tree structure indicating a result of an association in this case is illustrated in an example of FIG. 10B. With the stage 700 as a root, the electronic document 1010 and the electronic label 1090 are children, and the electronic document 1010 has the electronic labels 1012, 1014, 1016 and 1018 as children.

Figure 11A:
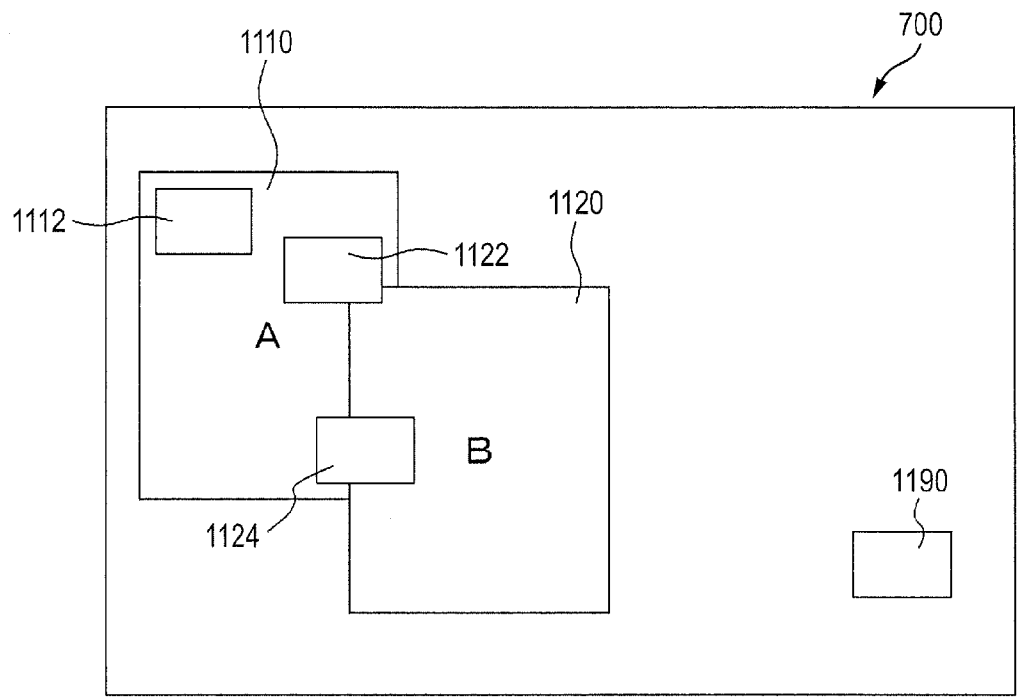
FIGS. 11A and 11B are diagrams illustrating a process example according to the present embodiment.
Figure 11B:
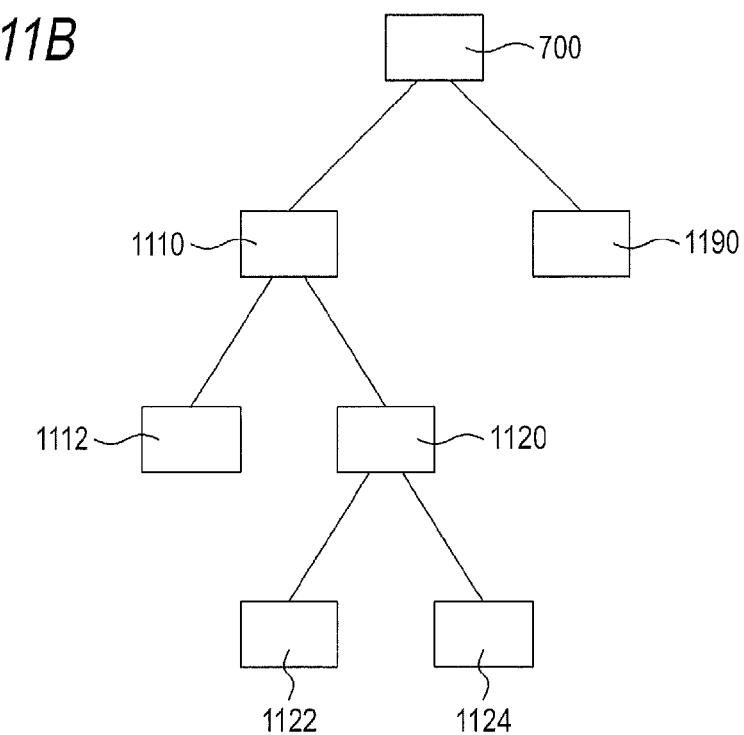

FIGS. 11A and 11B are diagrams illustrating a process example according to the present embodiment. In a case where an electronic label is attached to a place where objects overlap each other, an object of a directly higher display layer is set as a parent. In other words, in a case where there are plural objects having an overlap relationship with a target object, and there is an association between the objects, the target object is associated by using an object located at a lower layer in a tree structure as a parent. As illustrated in an example of FIG. 11A, an electronic document 1120 overlaps an electronic document 1110. In a case where an electronic label 1112 is located only on the electronic document 1110 in this state, the electronic label 1112 becomes a child of the electronic document 1110. For example, in a case where an electronic label 1122 and an electronic label 1124 overlap both the electronic document 1110 and the electronic document 1120, the electronic document 1110 and the electronic document 1120 have a parent-child relationship, and thus the electronic label 1122 and the electronic label 1124 are associated as a child of the electronic document 1120 which is a child. An electronic label 1190 becomes a child of the stage 700 according to the above-described rule illustrated in FIGS. 10A and 10B. A tree structure indicating a result of an association in this case is illustrated in an example of FIG. 11B. With the stage 700 as a root, the electronic document 1110 and the electronic label 1190 are children, the electronic document 1110 has the electronic label 1112 and the electronic document 1120 as children, and the electronic document 1120 has the electronic label 1122 and the electronic label 1124 as children.

Figure 12A:
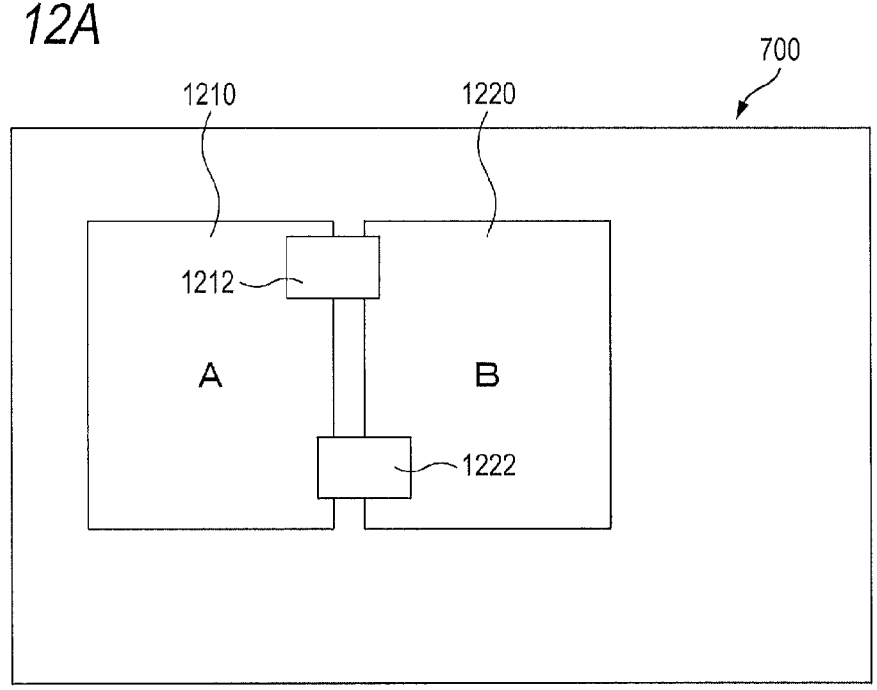
FIGS. 12A and 12B are diagrams illustrating a process example according to the present embodiment.
Figure 12B:
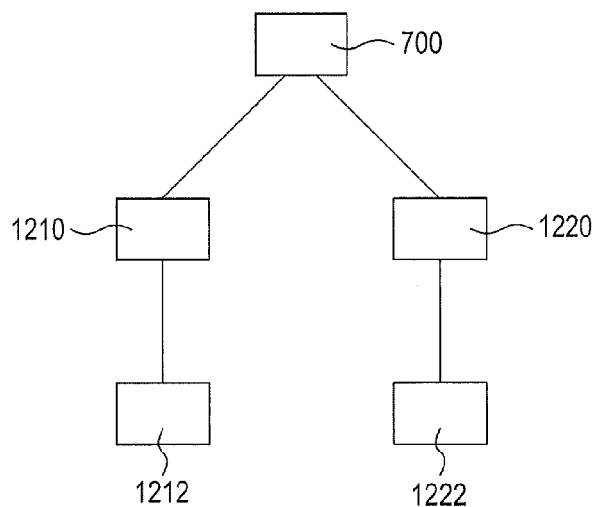

FIGS. 12A and 12B are diagrams illustrating a process example according to the present embodiment. In a case where an electronic label hangs over plural separated objects, an object having a larger overlap area with the electronic label is set as a parent. In other words, in a case where there are plural objects having an overlap relationship with a target object, and there is no association between the objects, an association is performed according to an overlap area. As illustrated in an example of FIG. 12A, an electronic document 1210 has no overlap relationship with an electronic document 1220. In a case where an electronic label 1212 and an electronic label 1222 overlap both the electronic document 1210 and the electronic document 1220, the electronic label 1212 overlaps the electronic document 1210 more than the electronic document 1220, and the electronic label 1222 overlaps the electronic document 1220 more than the electronic document 1210, the electronic label 1212 is set as a child of the electronic document 1210, and the electronic label 1222 is set as a child of the electronic document 1220. A tree structure indicating a result of an association in this case is illustrated in an example of FIG. 12B. With the stage 700 as a root, the electronic document 1210 and the electronic document 1220 are children, the electronic document 1210 has the electronic label 1212 as a child, and the electronic document 1220 has the electronic label 1222 as a child.

Figure 13:
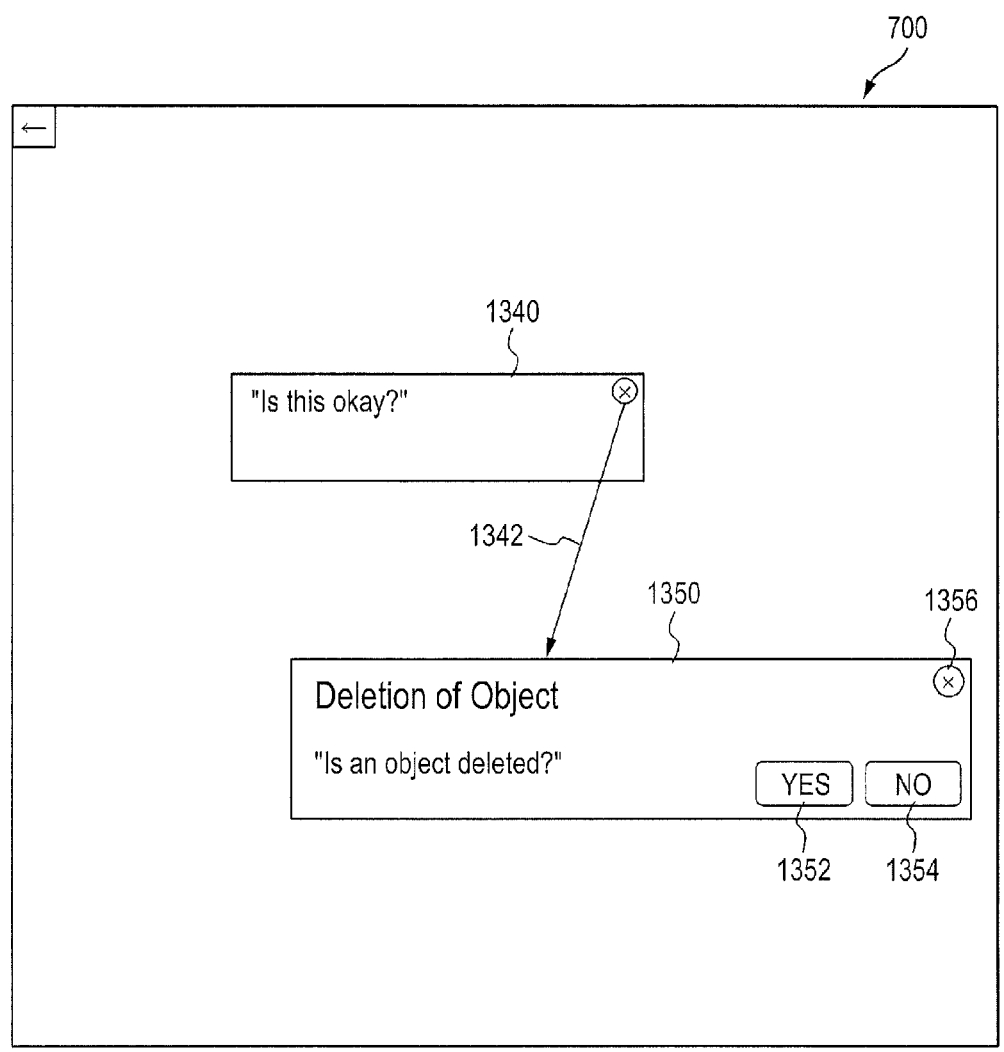
FIG. 13 is a diagram illustrating a deletion process example according to the present embodiment.

FIG. 13 is a diagram illustrating a deletion process example according to the present embodiment.

When a cursor is moved onto an electronic label 1340, a deletion instruction icon is displayed in a case where an operation is a creator of the electronic label 1340. In addition, in a case where another object is currently selected, even if the operator is a creator and moves the cursor onto the electronic label 1340, the deletion instruction icon is not displayed. Further, in a case of a touch panel, when the electronic label 1340 is clicked, the deletion instruction icon is displayed if the operator is a creator of the electronic label 1340. If the operator is not a creator, the deletion instruction icon is not displayed.

When the deletion instruction icon is clicked, an electronic label deletion dialog corresponding line 1342 and a deletion dialog 1350 are displayed. The deletion dialog 1350 includes a "Yes" button 1352, a "No" button 1354, and a close button 1356. A message, "Is an object deleted?" is displayed in the deletion dialog 1350. If the "Yes" button 1352 of the deletion dialog 1350 is clicked, the electronic label 1340 is deleted. If the "No" button 1354 and the close button 1356 are clicked, the electronic label 1340 is not deleted.

In addition, if a parent object is deleted, a child object is not deleted. In addition, a new parent is set again in a present positional relationship on the basis of the above-described rule.

Figure 14A:
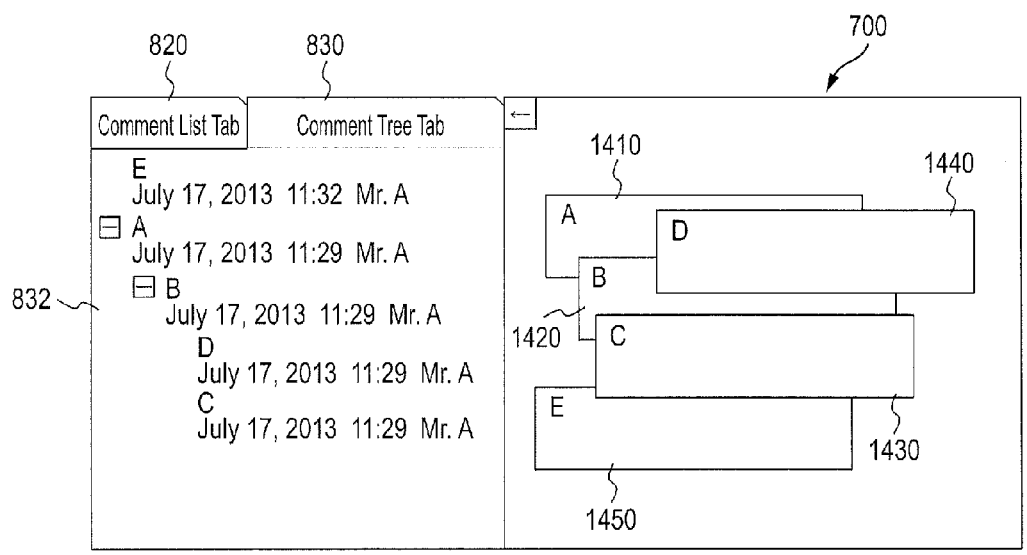
FIGS. 14A and 14B are diagrams illustrating a deletion process example according to the present embodiment.
Figure 14B:
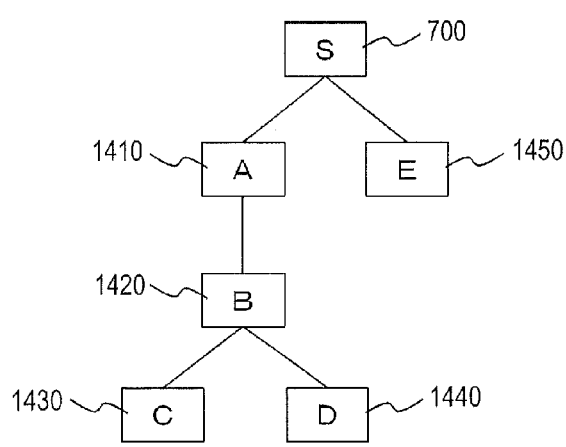

FIGS. 14A and 14B are diagrams illustrating a deletion process example according to the present embodiment. Particularly, description will be made of a case where an object is deleted when there is a child object.

1. Only an object which is a deletion target is deleted. A child object is not deleted.
2. A position of a child object is not changed.
3. In relation to a child object which is directly connected to a deleted object, a parent is set again in a present positional relationship on the basis of the above-described rule.

An example of FIG. 14B illustrates a state before an electronic label (B) 1420 is deleted. The stage 700 is a parent of an electronic label (A) 1410 and an electronic label (E) 1450, the electronic label (A) 1410 is a parent of the electronic label (B) 1420, and the electronic label (B) 1420 is a parent of an electronic label (C) 1430 and an electronic label (D) 1440. In addition, the electronic label (C) 1430 overlaps both the electronic label (B) 1420 and the electronic label (E) 1450, but the electronic label (B) 1420 and the electronic label (E) 1450 do not have a parent-child relationship with each other. An overlap area with the electronic label (C) 1430 is larger in the electronic label (B) 1420, and thus a parent of the electronic label (C) 1430 is not the electronic label (E) 1450 but the electronic label (B) 1420. A tree structure thereof is illustrated as in an example of FIG. 14B, and content display in which the tree structure is reflected is as in display of a comment tree display region 832 of a comment tree tab 830.

Figure 15A:
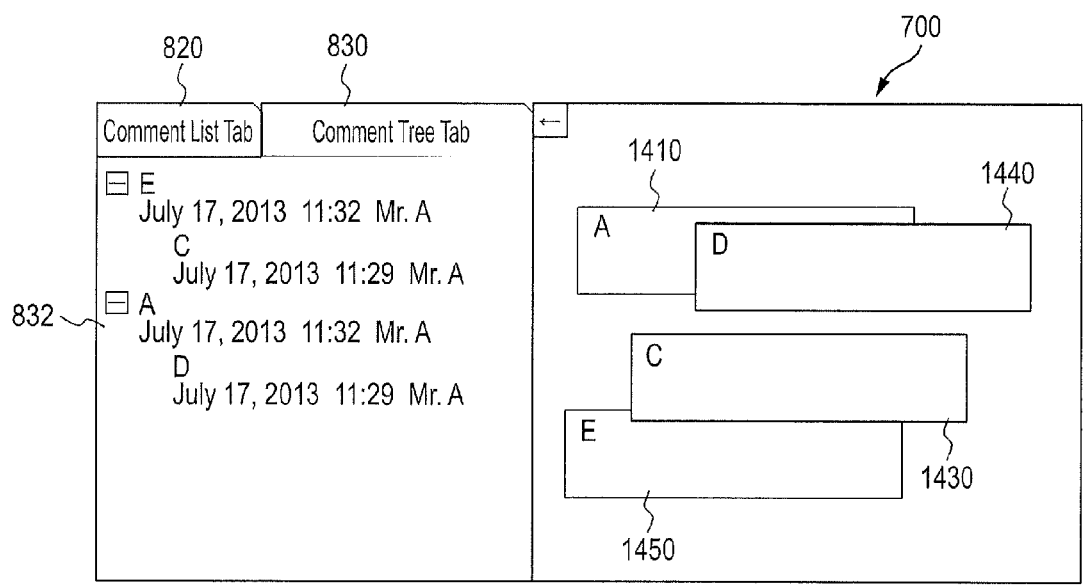
FIGS. 15A and 15B are diagrams illustrating a deletion process example according to the present embodiment.
Figure 15B:
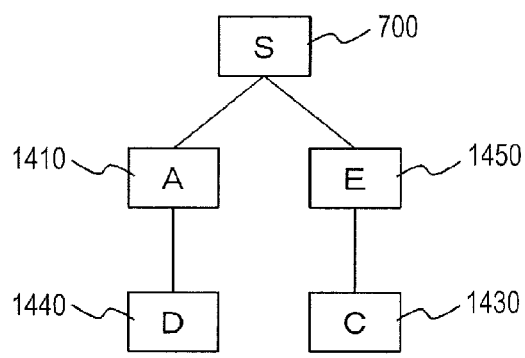

FIGS. 15A and 15B are diagrams illustrating a deletion process example according to the present embodiment.

An example of FIG. 15A illustrates a state after the electronic label (B) 1420 is deleted. The stage 700 is a parent of the electronic label (A) 1410 and the electronic label (E) 1450, the electronic label (E) 1450 is a parent of the electronic label (C) 1430, and the electronic label (A) 1410 is a parent of the electronic label (D) 1440.

Parent candidates of the electronic label (C) 1430 and the electronic label (D) 1440 are the stage 700, the electronic label (A) 1410, and the electronic label (A) 1450. According to the above-described rule illustrated in the example of FIGS. 10A and 10B, a parent of the electronic label (C) 1430 is the electronic label (E) 1450, and a parent of the electronic label (D) 1440 is the electronic label (A) 1410. A tree structure thereof is illustrated as in an example of FIG. 15B, and content display in which the tree structure is reflected is as in display of the comment tree display region 832 of the comment tree tab 830.

FIG. 16 is a diagram illustrating a process example according to the present embodiment. Particularly, description will be made of the comment display region (in FIG. 16, a comment list display region 822) formed by the comment list tab 820 and the comment tree tab 830. The comment display region can change between non-display and display.

The comment display region includes the comment list tab 820 and the comment tree tab 830.

A selection state of a comment (content in an electronic label) displayed in the comment display region is interlocked with a selection state of a corresponding electronic label which is attached to the stage 700. In addition, a retrieval word reception column 1640 may be provided in the comment list display region 822, and a comment may be retrieved.

Figure 17:
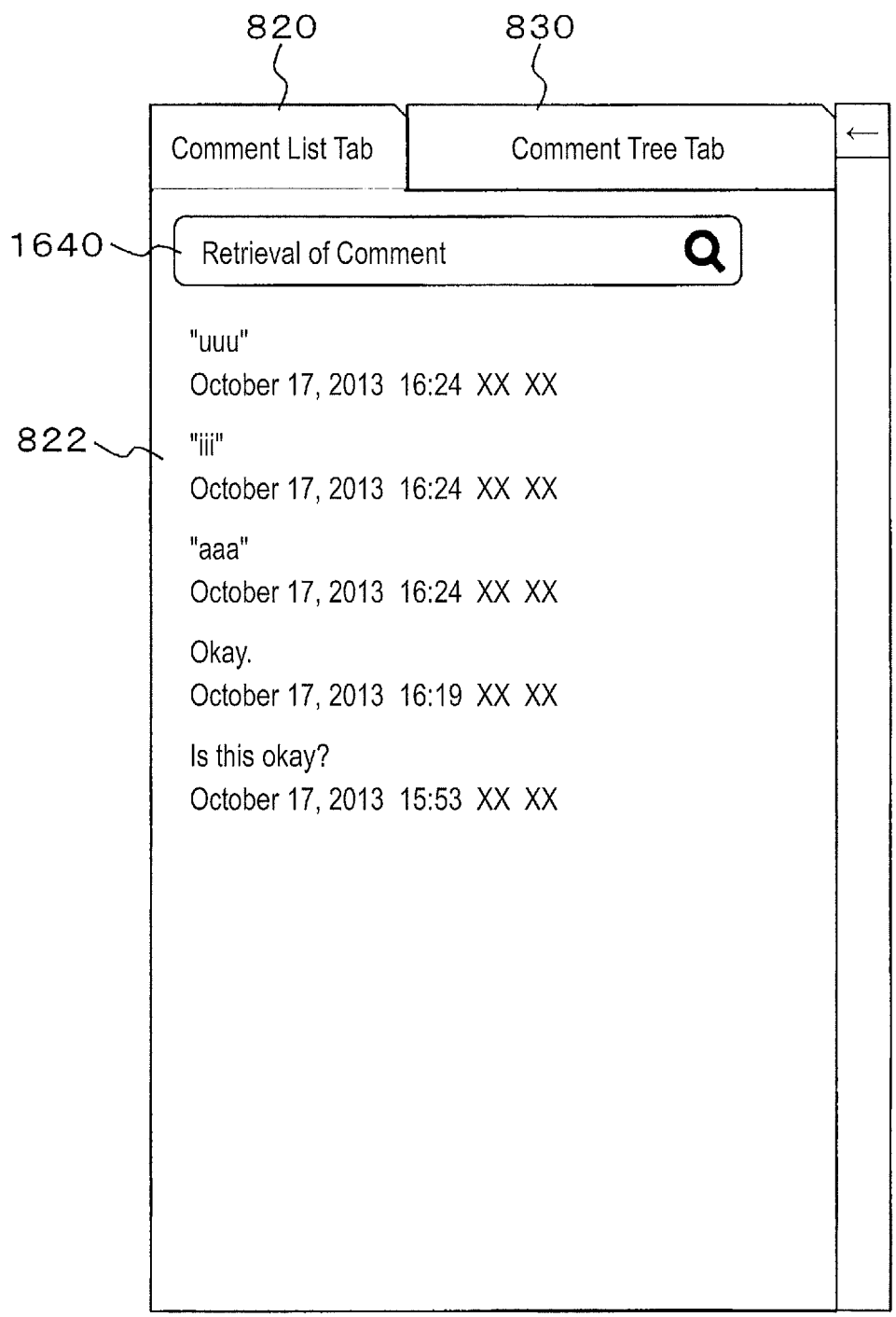
FIG. 17 is a diagram illustrating a process example according to the present embodiment.

FIG. 17 is a diagram illustrating a process example according to the present embodiment. FIG. 17 illustrates a display example of the comment list display region 822 when the comment list tab 820 is selected. In this example, a display order is a descending order of the update date and time. As display content, comment content, the update date and time, and a person to update are displayed.

If a new electronic label is created, a comment item is added to the top of a list in the comment list display region 822. In addition, if content of an electronic label is edited, an edited comment is displayed on the top of the list. If an electronic label is deleted, the comment is deleted from the list.

In addition, retrieval of a comment will be described. In a case where nothing is entered in the retrieval word reception column 1640, "retrieval of comment" is displayed. Through an operator's operation, any retrieval keyword is entered. In a case of plural keywords, the keywords are partitioned by an en space, and AND retrieval is performed.

When a keyword is entered in the retrieval word reception column 1640, and an Enter key or "retrieval" button is clicked, a retrieval result is displayed in which the keyword matches electronic label content, an updater, and the update date and time. In a case where a keyword is not entered, all comments are displayed.

Figure 18:
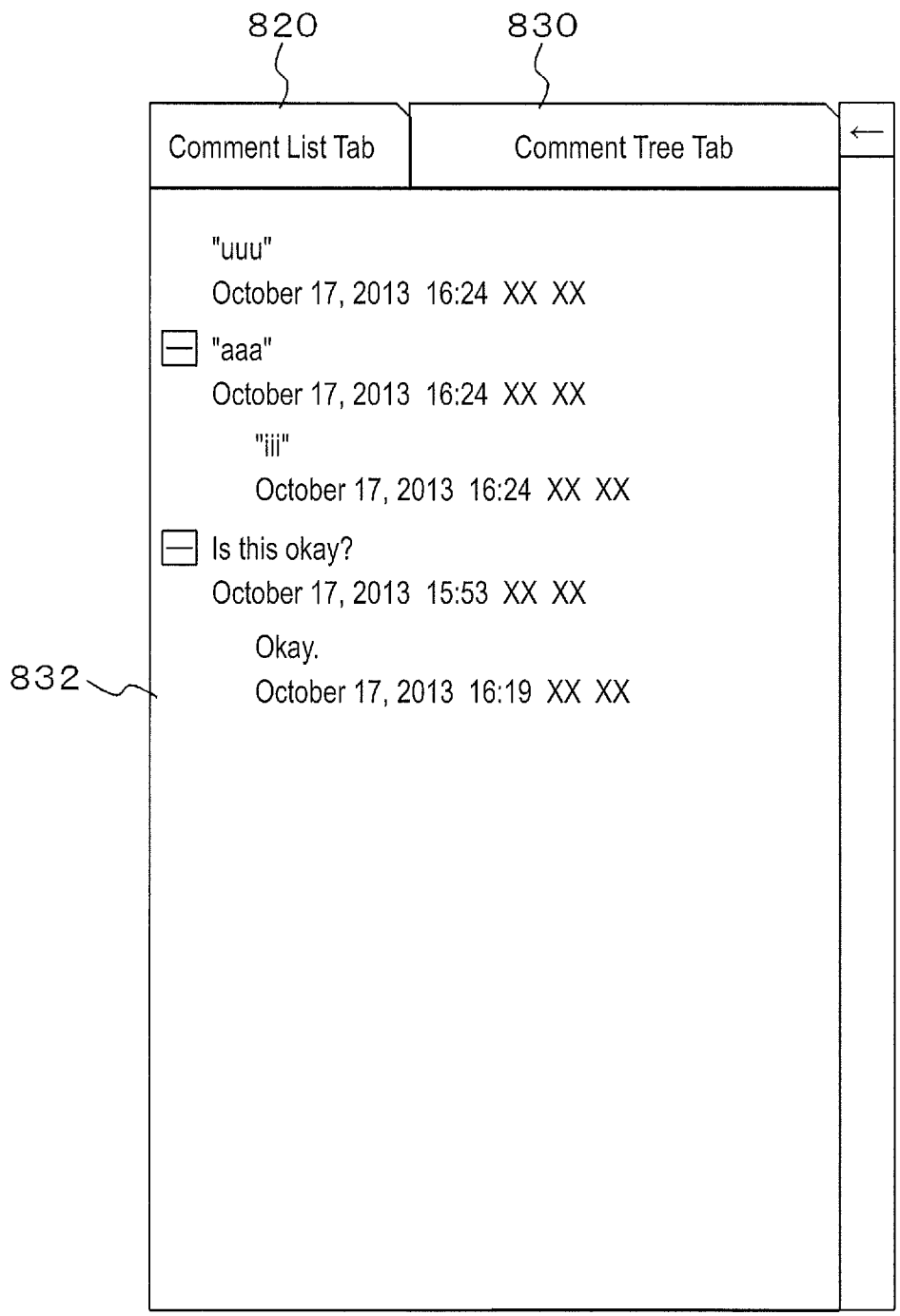
FIG. 18 is a diagram illustrating a process example according to the present embodiment.

FIG. 18 is a diagram illustrating a process example according to the present embodiment. FIG. 18 illustrates a display example of the comment tree display region 832 when the comment tree tab 830 is selected. In this example, a display order is a descending order from the update date and time of a highest-rank parent. A display order of lists with the same level is a descending order of the update date and time. As display content, comment content, the update date and time, and a person to update are displayed.

As for comments with the same level in the tree structure, text is displayed at the same positions (positions having the same distance from the left end). Text of a child comment is displayed further toward a right side than text of a parent comment.

If a new electronic label is created (so as not to overlap objects other than the stage 700), a comment item is added to the top of the list in the comment tree display region 832.

If a child electronic label is created, a comment item is added to the top of a child list.

If content is edited, the edited comment is displayed on the top of a list having edited comments with the same level.

If an electronic label is deleted, a comment is deleted from the list. According to the above-described rule, a child electronic label is updated by a new parent. The update is performed in a case where a parent-child relationship is canceled or a new relationship is generated due to movement of an electronic label.

Figure 19:
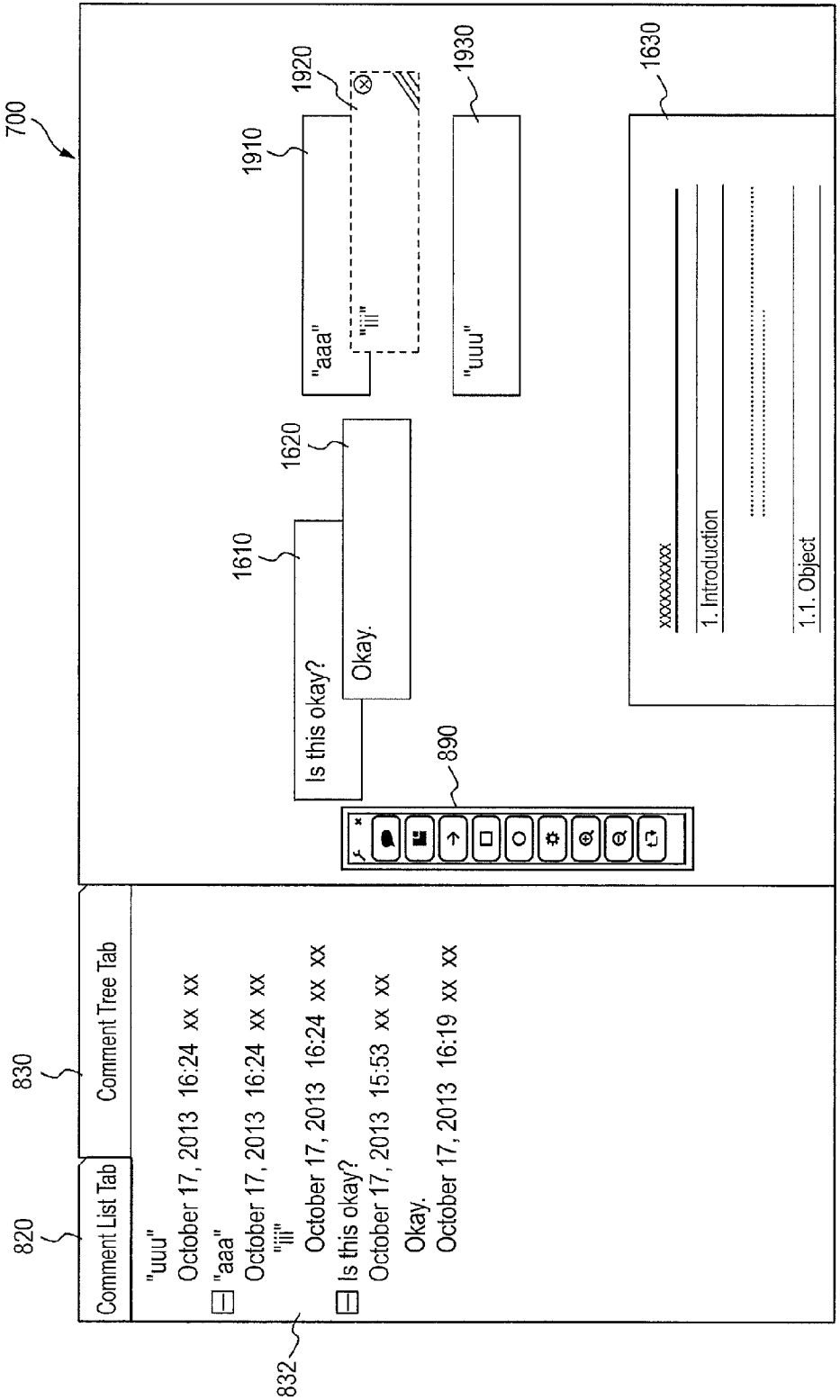
FIG. 19 is a diagram illustrating a process example according to the present embodiment.

FIG. 19 is a diagram illustrating a process example according to the present embodiment. FIG. 19 illustrates an example in which a comment display region, a comment, and a display state of an electronic label are interlocked with each other.

For example, if a comment in the comment tree display region 832 is selected, an electronic label corresponding to the comment is highlighted in a selection state as in an electronic label 1920 on the stage 700. In addition, in a case where a corresponding electronic label is not observed from the screen, the stage 700 is moved so that the electronic label is displayed near a center of the screen.

Conversely, if an electronic label on the stage 700 is selected, a comment corresponding to the electronic label is highlighted in the comment tree display region 832.

Figure 20:
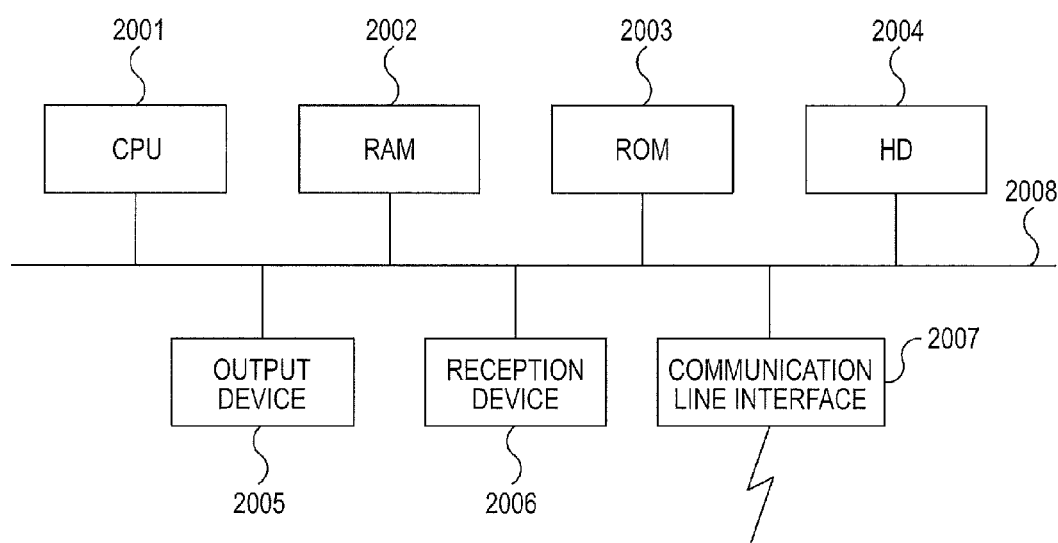
FIG. 20 is a block diagram illustrating a hardware configuration example of a computer which realizes the present embodiment.

In addition, a hardware configuration of a computer which is executed by a program as the present embodiment is a general computer as exemplified in FIG. 20, and is, specifically, a personal computer, a computer serving as a server, or the like. In other words, as a specific example, a CPU 2001 is used as a processing unit (calculation unit), and a RAM 2002, a ROM 2003, and an HD 2004 are used as a storage device. For example, a hard disk may be used as the HD 2004. The computer includes the CPU 2001 which executes programs such as the object editing operation receiving module 110, the object editing module 120, the object overlap determination module 140, the grouping process module 150, and the output module 160; the RAM 2002 which stores the programs or data; the ROM 2003 which stores a program or the like for activating the computer; the HD 2004 which is an auxiliary storage device ("flash memory" or the like); a reception device 2006 which receives data on the basis of a user's operation on a keyboard, a mouse, a touch panel, and the like; an output device 2005 such as a CRT or a liquid crystal display; a communication line interface 2007 for connecting a communication network such as a network interface card; and a bus 2008 via which the above-described elements are connected to each other and transmit and receive data. Plural computers may be connected to each other via a network.

In the above-described embodiment which is realized by a computer program, the computer program which is software is read to a system of the present hardware configuration, and the above-described embodiment is realized through cooperation between software and hardware resources.

In addition, the hardware configuration illustrated in FIG. 20 shows an configuration example, and the present embodiment is not limited to the configuration illustrated in FIG. 20, and may have a configuration which can execute the modules described in the present embodiment. For example, some modules may be configured by dedicated hardware (for example, an ASIC or the like); some modules may be provided in an external system and be connected to other modules via a communication line; and the system illustrated in FIG. 20 may be provided in plural manner, and plural systems may be connected to each other via a communication line and be operated in cooperation with each other. Further, particularly, the system may be incorporated into not only the personal computer, but also an information home appliance, a copier, a facsimile, a scanner, a printer, a multifunction machine (an image processing apparatus having two or more of functions among a scanner, a printer, a copier, a facsimile, or the like).

In addition, the above-described program may be stored in a recording medium so as to be provided, and the program may be provided via communication means. In this case, for example, the above-described program may be regarded as the invention relating to a "computer readable medium storing a program".

The "computer readable medium storing a program" indicates a computer readable recording medium storing a program, which is used to install, execute, and distribute the program.

In addition, the recording medium includes, for example, "DVD-R, DVD-RW, DVD-RAM, and the like" which are digital versatile discs (DVDs) and are standards formulated in accordance with the DVD forum, "DVD+R, DVD+RW, and the like" which are standards formulated in accordance with DVD+RW, CD-read only memory (CD-ROM), CD-recordable (CD-R), CD-rewritable (CD-RW), and the like which are a compact disc (CD), a Blue-ray (registered trademark) disc, a magneto-optical disc (MO), a flexible disc (FD), a magnetic tape, a hard disk, a read only memory (ROM), an electrically erasable programmable read only memory (EEPROM (registered trademark)), a flash memory, a random access memory (RAM), and a secure digital (SD) memory card.

In addition, the program or part thereof may be recorded on the medium so as to be preserved or distributed. Further, the program may be transmitted by using communication networks, for example, wired communication networks such as a local area network (LAN), a metropolitan area network (MAN), a wide area network (WAN), the Internet, an intranet, and an extranet, or a wireless communication network, or by using a transmission medium such as a combination thereof, and may be carried on a carrier wave so as to be transmitted.

Further, the program may be part of another program, and may be recorded on a medium along with a separate program. Furthermore, the program may be divided and recorded on plural recording media. Moreover, the program may be recorded in any format such as compression or encoding as long as the program can be recovered.

As stated above, the detailed description discloses an information processing apparatus managing displayed targets through a tree structure and including: a reception section that receives a deletion operation on a first target; and an associating section that associates a second target with a third target when the second target visually overlaps the third target as a result of the first target being deleted.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
 a processor and a memory that stores instructions executed by the processor, the processor being configured to:
  a receive a deletion operation of a first target object by a user, the first target object being associated as a child object of a third target object and being associated as a parent object of a second target object, a portion of the second target object being displayed on the first target object; and
  (i) associate the second target object as a child object of the third target object in a case of a portion of the second target object being displayed on the third target object as a result of the first target object being deleted and (ii) not associate the second target object as a child object of the third target object in a case of the second target object not being displayed on the third target object as a result of the first target object being deleted.

2. The information processing apparatus according to claim 1, wherein, when there are plural overlapped target objects, and there is an association between the overlapped target objects, the processor associates an overlapping target object with a lower layer of an overlapped target object located at the lowest layer among the plural overlapped targets objects.

3. The information processing apparatus according to claim 1, wherein the first target object indicates any one of an electronic label, an electronic document, and a graphic.

4. A non-transitory computer readable medium storing an information processing program causing a computer to execute a process for target objects, the process comprising:
 receiving a deletion operation of a first target object by a user, the first target object being associated as a child object of a third target object and being associated as a parent object of a second target object, a portion of the second target object being displayed on the first target object; and
 (i) associating the second target object as a child object of the third target object in a case of a portion of the second target object being displayed on the third target object as a result of the first target object being deleted and (ii) not associating the second target object as a child object of the third target object in a case of the second target object not being displayed on the third target object as a result of the first target object being deleted.

5. An information processing apparatus comprising:
 a processor and a memory that stores instructions executed by the processor, the processor being configured to:
  receive a deletion operation of a first target object; and
  associate a second target object with a third target object when the second target object visually overlaps the third target object as a result of the first target object being deleted, wherein:
 the processor performs an association in which an overlapped target object in the overlap is set to an upper layer in a tree structure and an overlapping target object is set to a lower layer in the tree structure, and
 when there are plural overlapped target objects, and there is no association between the overlapped target objects, the processor associates the overlapping target object with a lower layer of an overlapped target object having the largest overlap area with the overlapping target object.

* * * * *